United States Patent [19]

Laurent et al.

[11] 4,389,183

[45] Jun. 21, 1983

[54] EXTERNAL FRAME INJECTION MOLDING APPARATUS

[75] Inventors: Jean Laurent, Oyonnax; Bernard Monnet, Billignat; Philippe Pertuis, Oyonnax, all of France

[73] Assignee: Pont-A-Mousson S.A., Nancy, France

[21] Appl. No.: 193,692

[22] Filed: Oct. 3, 1980

[30] Foreign Application Priority Data

Oct. 9, 1979 [FR] France ............................... 79 25523

[51] Int. Cl.³ .......................... B29C 1/16; B29F 1/00
[52] U.S. Cl. .................................... 425/589; 425/593
[58] Field of Search ............... 425/589, 520, 575, 489, 425/490, 491, 400.1, 186, 129 R, 451–451.9, DIG. 220, DIG. 222, 450.1, 542–545, 592–595; 100/245; 164/303, 312, 314, 316

[56] References Cited

U.S. PATENT DOCUMENTS

| | | | |
|---|---|---|---|
| 2,233,354 | 2/1941 | Thilenius | 425/592 |
| 2,273,516 | 2/1942 | Dinzl | 425/575 |
| 2,433,132 | 12/1947 | Lester | 425/589 |
| 2,543,503 | 2/1951 | Lester et al. | 425/451.2 |
| 2,932,245 | 4/1960 | Hausman | 100/214 |
| 3,044,389 | 7/1962 | Rexford | 425/542 |
| 3,184,810 | 5/1965 | Hoern | 164/312 |
| 3,509,600 | 5/1970 | Noble | 425/542 |
| 3,563,167 | 2/1971 | Pennell | 100/214 |
| 3,576,161 | 4/1971 | Wright | 100/245 |
| 3,611,497 | 10/1971 | Gidge et al. | 425/DIG. 220 |
| 3,667,891 | 6/1972 | Gelin | 425/450.1 |
| 3,695,809 | 10/1972 | Vicini | 425/451.2 |
| 3,828,956 | 8/1974 | Dubo | 100/278 |
| 3,890,308 | 6/1975 | Collins | 425/451.6 |

FOREIGN PATENT DOCUMENTS

| | | | |
|---|---|---|---|
| 1442573 | 5/1966 | France | 425/542 |
| 2038413 | 4/1971 | France | 425/DIG. 221 |
| 2056993 | 7/1971 | France | 425/DIG. 221 |

*Primary Examiner*—Willard E. Hoag
*Attorney, Agent, or Firm*—Sughrue, Mion, Zinn, Macpeak and Seas

[57] ABSTRACT

A plastic injection molding device comprises a fixed plate 5 and a movable plate 7 bearing the two halves of a mold 3, a fixed plate 10 forming a bed, and hydraulic jacks 15, 17, 20 for moving and locking the plate 7. The plates are fixed or slidably mounted within a plurality of parallel hollow rectangular frames 11 which evenly distribute the forces transmitted by the fixed plates.

9 Claims, 4 Drawing Figures

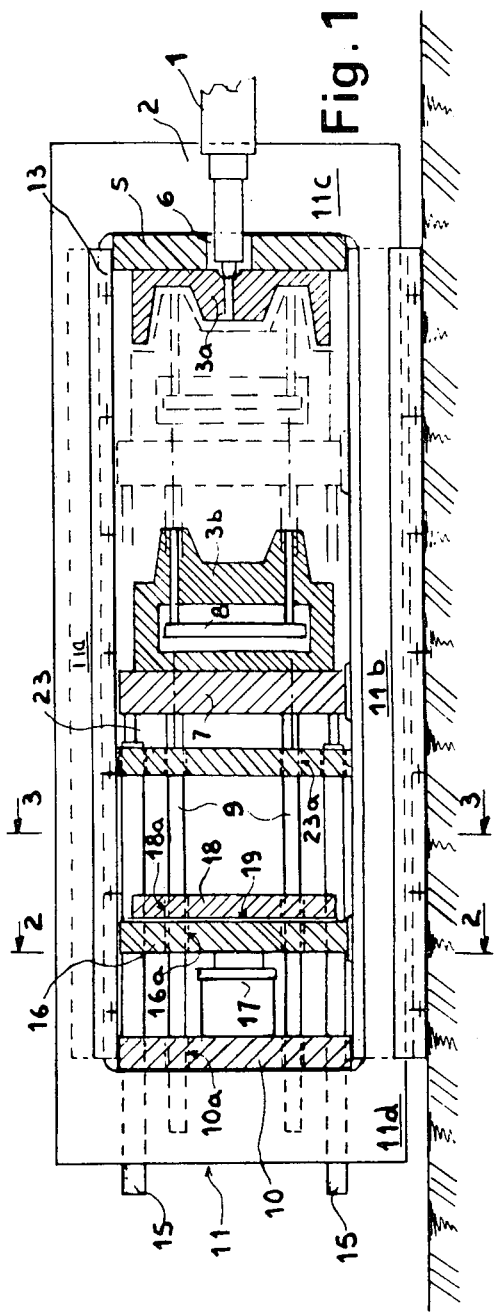
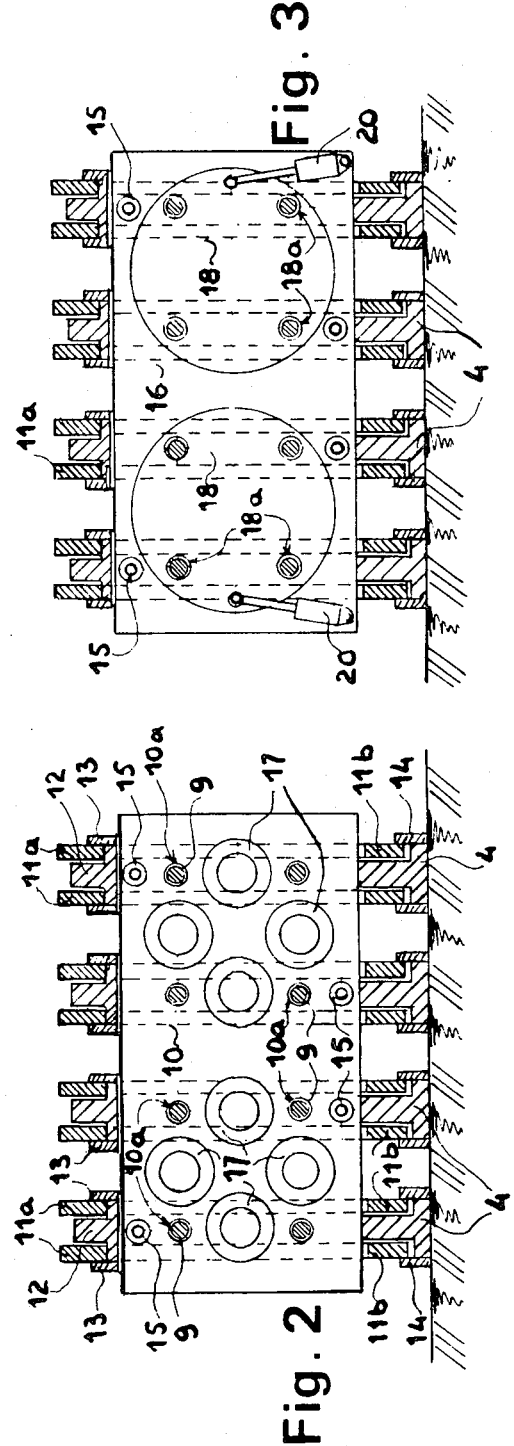

EXTERNAL FRAME INJECTION MOLDING APPARATUS

SUMMARY OF THE INVENTION

This invention relates to a press for the injection molding of articles in plastic, elastomers or the like.

BACKGROUND OF THE INVENTION

The usual injection molding device is generally composed of a fixed plate and a movable plate bearing respectively the two halves of a mold, with a third fixed plate forming a support or bed, All three plates are vertically disposed. Four parallel, horizontal columns make the bed integral with the fixed plate and guide the movable plate during its travel between the fixed plate and the bed under the action of hydraulic jacks, which also lock the two halves of the mold together.

In such known molding devices the columns traverse the fixed plates which they connect outside the zone occupied by the mold. These columns are also spaced as far as possible one from the other to enable access to the molding zone, generally being situated at the four corners of the plates. With such an arrangement the distribution of the forces transmitted by the plates to the columns is uneven at the level of the plates, however, whether in horizontal or vertical directions. In addition, as the plates must not undergo any deformation, it is necessary for them to have very high resistance to be able to withstand this poor force distribution. Also, as the columns join the plates outside the zone occupied by the mold, the dimensions of the plates are much greater than those of the mold itself. The result is that the plates have to be of a higher weight and therefore are more costly to produce.

In addition, when the object to be molded has relatively large dimensions, the injection and locking forces are large. As the columns have to bear these large forces they have to be of a relatively large diameter, and are therefore very difficult and costly to manufacture. Further, since the columns also guide the movable plate, when binding occurs during sliding, it is necessary to access the columns and disassemble them.

DESCRIPTION OF THE INVENTION

In order to remedy these various disadvantages, the present invention provides an injection molding device comprising a fixed plate and a movable plate respectively bearing the two halves of a mold, a fixed third plate or bed, and a device for moving the movable plate and locking the two halves of the mold together. The fixed plate and the bed are mounted within at least two parallel hollow rectangular frames, whose opposite ends act as a load bearing support for the fixed plate and the bed.

According to the invention, wherein the frames bear the fixed plates internally, the fixed plates are supported over their entire height in such a manner that the forces transmitted by the plates are evenly distributed over the frames. Additionally, it is possible to provide a good horizontal distribution of the forces by increasing the number of frames on which the plates are supported. The fixed and movable plates are supported by a framework formed of profiles which support and separate the frames, and which also guide the sliding of the movable plate.

BRIEF DESCRIPTION OF THE DRAWINGS

In the attached drawings:

FIG. 1 is a schematic elevational view of an injection molding device according to the invention;

FIG. 2 is a sectional schematic view through line 2—2 in FIG. 1;

FIG. 3 is a sectional schematic view through line 3—3 in FIG. 1; and

DETAILED DESCRIPTION OF THE PREFERRED EMBODIMENTS

Figure 4:
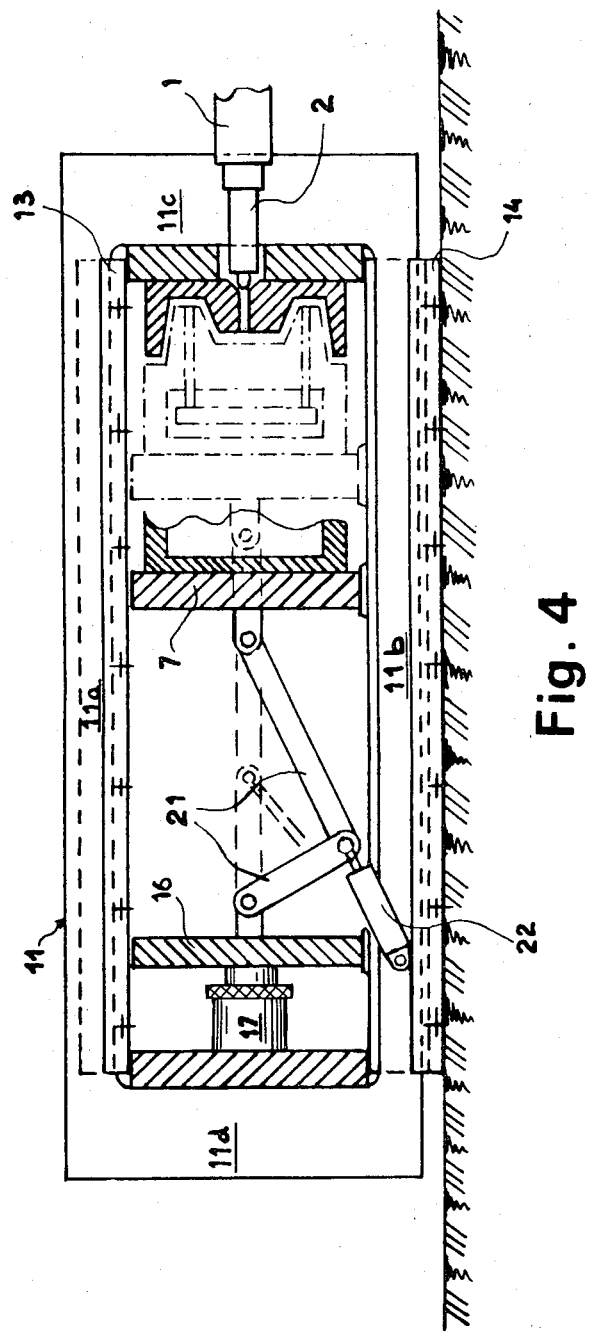
FIG. 4 is a schematic view similar to FIG. 1 of an injection molding device according to the invention provided with an alternative moving and locking device.

According to the embodiment shown in FIGS. 1 to 3, the present invention concerns injection molding with plastic using a standard injection device 1, for example a screw device provided with an injection nozzle 2, supplying a mold 3 formed of two half-molds 3a and 3b.

The disclosed construction includes a frame or support 4 formed of four metallic profiles which are parallel to one another. A first stationary plate 5 laid on the support 4 and bearing the fixed half-mold 3a is pierced by an orifice 6 for passage of the nozzle 2 of the injection device 1. A second movable plate 7 parallel to plate 5 and bearing the movable half-mold 3b is provided with a device 8 for ejecting the casting. This plate 7 is slidably mounted on the support 4 and has eight horizontal support stems 9 on the side opposite the mold. A third plate or bed 10, parallel to the two other plates, is fixedly mounted on the support 4.

Eight rectangular frames 11 with large horizontal sides 11a and 11b and small vertical sides 11c and 11d are parallel with one another. These frames 11, grouped in pairs, have their large upper sides 11a supported against the two plates 5 and 10 by means of profiles 12. The frames 11 situated on each side of the profiles 12 are pressed against the profiles by support plates 13 which are rigidly secured to the profiles 12. On their lower sides, the frames 11 are held, also in pairs, against the profiles which form the support 4 by plates 14 which are rigidly secured to the support 4. Plates 5 and 10 bear against the internal surfaces of the small sides 11c and 11d of the frames 11.

A device for moving the plate 7 is composed of four horizontal jacks 15 whose cylinders are connected to the bed 10 and whose pistons are fixed to the plate.

A device for locking the two halves of the mold is composed of a fourth plate 16, situated between the bed 10 and the movable plate 7, parallel to the other plates and sliding on the support 4. The fourth plate 16 is connected to the pistons of eight locking jacks 17 whose cylinders are connected to the bed 10 and carries, side by side, two discs 18 turning respectively on two axes 19 under the action of two jacks 20 borne by the plate 16. The plate 10, the fourth movable plate 16 and the discs 18 are each provided with eight orifices 10a, 16a and 18a respectively through which the eight support stems 9 of the movable plate 7 pass.

In operation, each half-mold being borne by the fixed plate 5 and the movable plate 7, respectively, slides under the action of the four moving jacks 15 on the frame 4 so that the half-mold 3a comes against half-mold 3b (shown by dotted line in FIG. 1). As plate 7 advances, the support stems 9 slide in the orifices 10a, 16a and 18a until they exit these orifices. Under the action of the jacks 20 the discs 18 are then rotated to an angle such that orifices 18a are no longer opposite stems 9. The jacks 17 are then pressurized and cause plate 16 and disc 18 to advance so that the discs 18 bear against the withdrawn ends of the stems 9. The tightening pressure of the mold is then caused by jacks 17 which are in contact with sides 11d of frames 11 on one side via plate 10, and on the other side, with the movable plate 7 and half-mold 3b via plate 16, discs 18 and the stems 9. The quantity of material necessary to fill the mold cavity 3 is then injected through nozzle 2 of the injection device 1.

After injection and hardening the pressure is removed from jack 17, the discs 18 are rotated back by jacks 20 until orifices 18a come into alignment with stems 9 and orifices 16a and 10a. The movable plate 7 is then separated by displacement jacks 15 from the fixed plate 5, and the manufactured element is liberated by the ejection device 8.

The invention thus provides for an injection molding device forming a rigid assembly which limits deformations of the mold whilst being produced from an assembly of parts of non-prohibitive size and cost. This rigidity is obtained due to the presence of frames 11 which enable even distribution of the force on the plates both horizontally and vertically. Indeed, the plates 5 and 10 are supported over their entire height on sides 11c and 11d of frames 11 and in addition, several frames can be distributed on the length of the plates.

This embodiment of the injection molding device using frames is particularly useful for the molding of long elements or articles since additional frames may be added to support the weight of longer plates.

As the frames are situated outside the fixed and movable plates, as opposed to the columns of known devices, the plates have dimensions similar to those of the mold. As the frames provide only for the transmission of force and not for the the sliding of the movable plates, they are not subjected to the transverse forces caused by the weight of the molds and the plates. The device has the additional advantage, due to the lightness of its component parts, of only requiring lighter and less costly housing structures than are needed for columnar molding devices. Also, the manufacture of such a device is much easier to carry out, since it is easier to fabricate sheets of metal or profiles than parts such as columns. As the sides 11c of frames 11 are situated on both sides of the nozzle of injection device 1, the frames, during injection, also act to protect the environment against the splashing of material coming out of the nozzle.

An alternative embodiment replaces the moving and locking device described above and shown in FIGS. 1 to 3 with a moving and locking device having an elbow joint 21 controlled by a jack 22. Such a construction is shown in FIG. 4.

Due to the good distribution of forces on the plates, it is possible to fabricate them in several modular elements. Between these modular elements various devices could also be included which are necessary for a better casting, such as blocks for distributing the material, systems for ejection, and control and cooling circuits. On a same injection molding device there can also be frames of different dimensions adapted to the forces to be borne.

A further alternative would be to provide a supplemental plate parallel to the other plates and situated between the movable plates 7 and 16. This supplemental plate would have an orifice for the passage of the support stems 9, be fixed on the frame 4, and provide better support for the large sides of frames 11.

A further alternative would be to replace the profiles 12 for supporting and separating the frames 11 with H-shaped profiles providing for the separation of the frames, the profiles and the frames being secured to the plates by wedges.

What is claimed is:

1. A device for the injection molding of plastic articles or the like, said device having a generally horizontal axis and comprising a fixed first plate and a movable second plate respectively bearing the two halves of a mold, a fixed third plate or bed, and means for moving the movable second plate and for urging the two halves of the mold together, characterized by: the fixed first plate (5) and the bed (10) being mounted within at least two hollow rectangular frames (11) disposed parallel to each other, said frames being independently suspendedly supported by the fixed plate (5) and the bed (10) with no rigid connections between ones of said frames.

2. The molding device of claim 1, wherein the frames are borne by support profiles (12) bearing on the plates.

3. The molding device of any one of claims 1 to 2, wherein a frame is positioned on each side of each support profile.

4. The molding device of any one of claims 1 to 3, wherein the plates are produced from modular elements.

5. The molding device of any one of claims 1 to 3, wherein a fixed plate situated between the movable plate (7) and the bed (10) supports the frames (11).

6. The molding device of any one of claims 1 to 3, wherein at least one dimension of each of said frames is varied in accordance with the proportion of the total force produced during molding borne by said frame.

7. The molding device of any one of claims 1 to 3, wherein said rectangular frames are provided in pairs, one of said profiles (4) providing separation for each of said pairs, a plurality of said pairs of frames being provided.

8. The molding device of claim 1, wherein a framework formed of profiles (4) bearing the plates (5, 7,10) provides the support for and the separation of the frames (11).

9. The molding device of claim 8, wherein the framework acts as a sliding support for the movable second plate.

* * * * *